United States Patent
Hirota et al.

(10) Patent No.: US 7,026,396 B2
(45) Date of Patent: Apr. 11, 2006

(54) AROMATIC VINYL POLYMER RESIN COMPOSITION AND ITS MOLDING

(75) Inventors: Shogo Hirota, Ichihara (JP); Ryozo Okumura, Ichihara (JP); Makoto Wakabayashi, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 200 days.

(21) Appl. No.: 10/196,195

(22) Filed: Jul. 17, 2002

(65) Prior Publication Data

US 2003/0022990 A1  Jan. 30, 2003

(30) Foreign Application Priority Data

Jul. 23, 2001  (JP) .............................. 2001-221042

(51) Int. Cl.
*C08L 9/00* (2006.01)
*C08L 25/02* (2006.01)
*C08L 53/00* (2006.01)

(52) U.S. Cl. ............................ 525/88; 525/89; 525/95; 525/232; 525/241

(58) Field of Classification Search ................. 525/88, 525/89, 95, 232, 241
See application file for complete search history.

(56) References Cited

U.S. PATENT DOCUMENTS

| 4,560,727 | A | * | 12/1985 | Crossan | ........................ | 525/95 |
| 5,089,558 | A | * | 2/1992 | Hall et al. | ...................... | 525/89 |
| 5,532,315 | A | * | 7/1996 | Bonekamp et al. | ........... | 525/71 |
| 6,734,247 | B1 | * | 5/2004 | Donn et al. | .................. | 524/500 |

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

Provided are an aromatic vinyl polymer resin composition capable of being molded into resin foam sheets having good surface smoothness and glossiness well balanced with the mechanical strength thereof even when the expansion ratio in molding is increased, and resin foam sheets and containers of the composition. The resin composition comprises (A) from 80 to 98% by mass of an aromatic vinyl polymer resin having a weight-average molecular weight measured through GPC of from 200,000 to 400,000, a ratio of weight-average molecular weight to number-average molecular weight ranging from 2.2 to 3.6, a number of branches of from 0.1 to 1.0 in one molecule having an absolute molecular weight of 1,190,000 measured through GPC-MALLS, and a melt flow rate of from 1.5 to 3.5 g/10 min, and (B) from 2 to 20% by mass of a styrene-diene block copolymer or its hydrogenate. This is molded into a resin foam sheet through extrusion foaming, and the sheet is thermoformed into containers.

10 Claims, No Drawings

AROMATIC VINYL POLYMER RESIN COMPOSITION AND ITS MOLDING

BACKGROUND OF THE INVENTION

1. Field of the Invention

The present invention relates to an aromatic vinyl polymer resin composition and its moldings. More precisely, the invention relates to an aromatic vinyl polymer resin composition suitable to molding into resin foam sheets having a good appearance well balanced with the mechanical strength thereof even when the expansion ratio in molding is increased, and to its resin foam sheets and containers.

2. Description of the Related Art

Aromatic vinyl polymer resin, especially atactic polystyrene resin is a plastic material inexpensive and having the advantages of good extrudability, injection moldability and fabricability, and it has many applications, for example, for electric appliances for household use, implements for office use and food wrapping and packaging materials. In particular, since resin foam sheets and moldings of such aromatic vinyl polymer resin are easy to fabricate and are tough and have good heat-retaining properties, they are indispensable in the field of food wrapping and packaging technology.

However, the resin foam sheets and moldings have a problem in that their surface smoothness and glossiness may lower and lose a feel of high-quality appearance with the increase in their expansion ratio. The problem of poor surface condition of the sheets and moldings leads to another problem when they are directly printed with ink in a mode of profile printing, in that the appearance of their printed surfaces is extremely bad.

To solve the problems with the resin foam sheets and moldings, in general, the expansion ratio of the aromatic vinyl polymer resin for them is controlled to fall in a low range of from 1.5 to 2.5 times to thereby make them have a feel of high-quality appearance. For the moldings having the resin expansion ratio of from 3 to 12 times, applied is a method of laminating their surface with a non-foam film, and the film-laminated moldings are printed on the film in a mode of profile printing. However, the method of controlling the expansion ratio in molding the resin and the method of laminating the moldings with a non-foam film increase the production costs. Therefore, it is desired to develop an inexpensive method of molding the resin into foam sheets or moldings having good surface smoothness and glossiness even when the resin expansion ratio is high.

SUMMARY OF THE INVENTION

An object of the present invention is to provide an aromatic vinyl polymer resin composition suitable to molding into resin foam sheets having good surface smoothness and glossiness well balanced with the mechanical strength thereof even when the expansion ratio in molding it is increased, and to provide resin foam sheets and containers of the composition.

We, the present inventors assiduously studied to solve the problems noted above. As a result, it has been found that an aromatic vinyl polymer resin composition that comprises an aromatic vinyl polymer resin having a specific molecular weight, a specific molecular weight distribution, a specific number of branches and a specific melt flow rate, and a styrene-diene block copolymer or its hydrogenate can attain the above-mentioned object. On the basis of this finding, we have completed the present invention.

Specifically, the invention is summarized as follows:

(1) An aromatic vinyl polymer resin composition comprising (A) from 80 to 98% by mass of an aromatic vinyl polymer resin having (1) a weight-average molecular weight (MwL) measured through GPC of from 200,000 to 400,000, (2) a ratio of weight-average molecular weight (MwL) to number-average molecular weight (MnL), (MwL)/(MnL) ranging from 2.2 to 3.6, (3) a number of branches of from 0.1 to 1.0 in one molecule having an absolute molecular weight of 1,190,000 measured through GPC-MALLS, and (4) a melt flow rate of from 1.5 to 3.5 g/10 min, and (B) from 2 to 20% by mass of a styrene-diene block copolymer or its hydrogenate.

(2) The aromatic vinyl polymer resin composition of above (1), wherein the aromatic vinyl polymer resin (A) is a polystyrene resin.

(3) The aromatic vinyl polymer resin composition of above (1) or (2), wherein the styrene-diene block copolymer or its hydrogenate (B) is a styrene-butadiene block copolymer or styrene-isoprene block copolymer or a hydrogenate thereof that contains polystyrene block structure units to an extent of from 10 to 90% by mass thereof.

(4) A resin foam sheet formed by molding the aromatic vinyl polymer resin composition of any of above (1) to (3) through extrusion foaming to an expansion ratio of from 3 to 12 times.

(5) A container molded by thermoforming the resin foam sheet of above (4).

DESCRIPTION OF THE PREFERRED EMBODIMENTS

The aromatic vinyl polymer resin composition of the invention comprises (A) from 80 to 98% by mass of an aromatic vinyl polymer resin having (1) a weight-average molecular weight (MwL) measured through GPC of from 200,000 to 400,000, (2) a ratio of weight-average molecular weight (MwL) to number-average molecular weight (MnL), (MwL)/(MnL) ranging from 2.2 to 3.6, (3) a number of branches of from 0.1 to 1.0 in one molecule having an absolute molecular weight of 1,190,000 measured through GPC-MALLS, and (4) a melt flow rate of from 1.5 to 3.5 g/10 min, and (B) from 2 to 20% by mass of a styrene-diene block copolymer or its hydrogenate.

The first characteristic of the aromatic vinyl polymer resin component (A) in the aromatic vinyl polymer resin composition of the invention is that its weight-average molecular weight (MwL) measured through GPC must be in the range of from 200,000 to 400,000. The weight-average molecular weight (MwL) of the resin (A) is a linear weight-average molecular weight (MwL) thereof measured through GPC (gel permeation chromatography). For example, it is measured as follows: Waters' Model 484 is used as a UV detector. TSK GEL GMH6 (made by Tosoh Corporation) is used as a chromatography column. Tetrahydrofuran is used as a solvent. A sample of the resin dissolved in the solvent is introduced into the column at a flow rate of 1.0 ml/min and at a temperature of 40° C. The amount of the resin sample introduced into the column is 200 μl, and the concentration thereof is 0.2 g/100 ml. In that condition, a standard calibration curve is prepared, based on standard polystyrene (made by Tosoh Corporation). Using it, the weight-average molecular weight (MwL) and the number-average molecular weight of the resin (A) are calculated according to the following formulae (1) and (2):

$$MwL = \Sigma(WiMi)/\Sigma(Wi) \quad (1)$$

$$MnL = \Sigma(Wi)/\Sigma(Wi/Mi) \quad (2)$$

wherein Wi indicates the weight fraction of the elusion volume (Vi); and Mi indicates the molecular weight of the elusion volume (Vi).

Thus measured through such GPC, the weight-average molecular weight (MwL) of the aromatic vinyl polymer resin component (A) for use in the invention ranges from 200,000 to 400,000. This is because, if the weight-average molecular weight (MwL) of the resin (A) is smaller than 200,000, the mechanical strength of the moldings of the aromatic vinyl polymer resin composition containing the resin (A) will be insufficient; and if larger than 400,000, the resin composition containing the resin (A) will likely lead to a reduction of extrusion moldability. More preferably, the weight-average molecular weight (MwL) of the aromatic vinyl polymer resin component (A) ranges from 250,000 to 350,000.

The second characteristic of the aromatic vinyl polymer resin component (A) in the aromatic vinyl polymer resin composition of the invention is that the ratio of its weight-average molecular weight (MwL) to number-average molecular weight (MnL), (MwL)/(MnL) falls between 2.2 and 3.6. If the ratio of the weight-average molecular weight (MwL) to number-average molecular weight (MnL) of the resin (A), (MwL)/(MnL) is smaller than 2.2, the latitude in thermoforming the foamed sheet of the aromatic vinyl polymer resin composition containing the resin (A) will be narrow; but if larger than 3.6, the mechanical strength of the moldings of the resin composition containing the resin (A) will be low. More preferably, the ratio of the weight-average molecular weight (MwL) to the number-average molecular weight (MnL) of the aromatic vinyl polymer resin component (A) ranges from 2.5 to 3.0.

The third characteristic of the aromatic vinyl polymer resin component (A) in the aromatic vinyl polymer resin composition of the invention is that the number of branches in one molecule of the resin having an absolute molecular weight measured through GPC (gel permeation chromatography)-MALLS of 1,190,000 ranges from 0.1 to 1.0. The number of branches in one molecule of the resin having an absolute molecular weight measured through GPC-MALLS of 1,190,000 is measured, for example, as follows: Wyatt Technology's DAWN-E is used as a light-scattering photometer. Waters' Model 410 is used as an RI detector. Three chromatography columns of TSK GEL GMH$_{HR}$-H(30) (made by Tosoh Corporation) are used. Tetrahydrofuran is used as a solvent. A sample of the resin dissolved in the solvent is introduced into the columns at a flow rate of 1.0 ml/min and at a temperature of 40° C. The amount of the resin sample introduced into the column is 100 µl, and the concentration thereof is 0.1 g/100 ml. In that condition, the absolute molecular weight ($M_B$) of the resin is measured. In addition, using Wyatt Technology's ASTRA, the inertial radius of the resin is measured. The number of branches in one molecule of the resin having an absolute molecular weight of 1,190,000 is measured according to the method described in *J. Chem. Phys.*, Vol. 17, p. 1301 (1949). Concretely, the number of branches in one molecule of the resin having an absolute molecular weight of 1,190,000 ($n_{1,190,000}$) is calculated according to the following formula (3) combined with the following formula (4), in which $Rg_L$ indicates the inertial radius of a linear aromatic vinyl polymer resin having an absolute molecular weight ($M_B$) of 1,190,000 and $Rg_B$ indicates the inertial radius of a branched aromatic vinyl polymer resin having an absolute molecular weight ($M_B$) of 1,190,000:

$$g_{1,190,000} = (Rg_B)^2/(Rg_L)^2 \quad (3)$$

$$g_{1,190,000} = (1/n_{1,190,000}) \times \ln(1+n_{1,190,000}) \quad (4)$$

The aromatic vinyl polymer resin component (A) to be in the aromatic vinyl polymer resin composition of the invention shall satisfy the requirement that the number of branches in one molecule of the resin having an absolute molecular weight of 1,190,000 ranges from 0.1 to 1.0. This is because, if the number of branches in the resin (A) is smaller than 0.1, the latitude in thermoforming the foamed sheet of the aromatic vinyl polymer resin composition containing the resin (A) will be narrow and, in addition, the mechanical strength of the thermoformed articles of the resin foam sheet will be low. On the other hand, if the number of branches in the resin (A) is larger than 1.0, the products from the aromatic vinyl polymer resin composition containing the resin (A) will have gel spots and their appearance will be thereby worsened. More preferably, the number of branches of one molecule of the resin (A) having an absolute molecular weight of 1,190,000 ranges from 0.2 to 0.8.

The fourth characteristic of the aromatic vinyl polymer resin component (A) in the aromatic vinyl polymer resin composition of the invention is that its melt flow rate ranges from 1.5 to 3.5 g/10 min. The melt flow rate of the resin is measured according to JIS K-7210, at a temperature of 200° C. under a load of 49 N. If the melt flow rate of the resin (A) is smaller than 1.5 g/10 min, the productivity of the aromatic vinyl polymer resin composition containing the resin (A) will be low and, in addition, the appearance of the products from the resin composition will be poor. On the other hand, if the melt flow rate of the resin (A) is larger than 3.5 g/10min, the mechanical strength of the products from the resin composition containing the resin (A) will be low. More preferably, the melt flow rate of the aromatic vinyl polymer resin component (A) falls between 2.0 and 3.0 g/10 min.

The aromatic vinyl polymer resin component (A) can be produced in any known method of, for example, thermal polymerization or initiator-assisted polymerization of an aromatic vinyl compound. For producing it, especially preferred is polymerization of the monomer in the presence of a polyfunctional initiator. The aromatic vinyl compound to give the polymer includes, for example, styrene, α-substituted alkylstyrenes such as α-methylstyrene; nucleus-substituted alkylstyrenes such as p-methylstyrene, p-tert-butylstyrene; and nucleus-substituted halogenostyrenes such as p-chlorostyrene. Of those aromatic vinyl compounds, styrene is preferred. The aromatic vinyl compound may be combined with a small amount of comonomer capable of copolymerizing with it. The comonomer includes, for example, vinyl compounds such as acrylonitrile, acrylic acid, methacrylic acid, maleic acid, fumaric acid, maleic anhydride, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate; and maleimides and nucleus-substituted phenylmaleimides.

For the polyfunctional initiator to be used in polymerization of the aromatic vinyl compound, preferred is a trifunctional or tetrafunctional initiator. Examples of the polyfunctional initiator are 2,2-bis(4,4-di-tert-butylperoxycyclohexyl)propane, 2,2,-bis(4,4-di-tert-hexylperoxycyclohexyl)propane, 2,2-bis(4,4-di-tert-octylperoxycyclohexyl)propane. Preferably, the amount of the polyfunctional initiator to be in the polymerization system ranges from 200 to 500 ppm of the aromatic vinyl compound therein. If the amount of the polyfunctional initiator is smaller than 200 ppm of the aromatic vinyl compound, the number of branches in one molecule of the resulting aromatic vinyl polymer resin having an absolute molecular weight of 1,190,000 will be smaller than 0.1; but if larger than 500 ppm, the number of branches in one molecule of the resulting aromatic vinyl polymer resin having an absolute molecular weight of 1,190,000 will be larger than 1.0. More preferably, the amount of the polyfunctional initiator to be in the polymerization system ranges from 250 to 400 ppm, even more preferably between 300 and 400 ppm of the aromatic vinyl compound therein.

Not specifically defined, the mode of polymerization of the aromatic vinyl compound to give the polymer may be any known one. Preferred is bulk polymerization, and more preferred is continuous bulk polymerization. Various types of polymerization reactors may be used. Preferred are a stirring polymerization reactor for complete mixing, a plug-flow polymerization reactor, a polymerization reactor for static mixing, and their combination disposed in a loop. More preferred is a polymerization unit comprising at least two such reactors connected in series. In case where the aromatic vinyl compound is polymerized in such a polymerization unit that comprises plural reactors connected in series, the reaction temperature in each polymerization reactor is controlled to fall within the temperature range in ordinary initiator-assisted polymerization. Preferably, however, the temperature condition is so controlled that the lowermost reaction temperature in all the polymerization reactors is not higher than 115° C. and the highest temperature is higher than 155° C. In polymerizing the aromatic vinyl compound, the polyfunctional initiator may be added directly thereto, or may be added to the polymerization system, for example, after the degree of conversion into polymer has reached 20 to 40%. The polyfunctional initiator may be added thereto all at a time, or intermittently. Preferably, however, it is added to the polymerization system all at a time before the start of polymerization.

In place of the method of polymerizing the aromatic vinyl compound in the presence of a polyfunctional initiator to produce the aromatic vinyl polymer resin, also employable herein is a method of copolymerizing the aromatic vinyl compound with an unsaturated compound having at least two copolymerizing double bonds. The unsaturated compound includes, for example, non-conjugated divinyl compounds such as divinylbenzene; polyacrylates such as ethylene glycol dimethacrylate, trimethylolpropane trimethacrylate, tetramethylolmethane tetraacrylate; and their mixtures. The amount of the unsaturated compound to be added to the aromatic vinyl compound may range from 50 to 250 ppm of the aromatic vinyl compound. This is because, if the amount of the unsaturated compound added is smaller than 50 ppm, the number of branches in one molecule of the resulting aromatic vinyl polymer resin having an absolute molecular weight of 1,190,000 may be smaller than 0.1; and if larger than 250 ppm, the number of branches in one molecule of the resulting aromatic vinyl polymer resin having an absolute molecular weight of 1,190,000 may be larger than 1.0.

The aromatic vinyl polymer resin thus produced in the manner as above is introduced into a devolatizing unit such as a flush drum, in which the non-reacted aromatic vinyl compound and dimers, trimers and other oligomers of the aromatic vinyl compound are removed from the product. Through the process, the intended aromatic vinyl polymer resin can be obtained. Preferably, the oligomer content of the aromatic vinyl polymer resin is from 0.2 to 0.7% by mass, and the residual volatile content thereof is at most 500 ppm.

The styrene-diene block copolymer (B) for use in the invention comprises polystyrene blocks and diene polymer blocks such as polybutadiene or polyisoprene blocks. For it, for example, preferred is a polystyrene-polybutadiene block copolymer having a configuration of polystyrene-polybutadiene-polystyrene or polystyrene-polybutadiene. Also preferred is a polystyrene-polyisoprene block copolymer having a configuration of polystyrene-polyisoprene-polystyrene or polystyrene-polyisoprene. Preferably, the block copolymer of any such configuration contains from 10 to 90% by mass of polystyrene structure units. This is because, if the content of polystyrene structure units in the styrene-diene block copolymer (B) is smaller than 10% by mass, the surface impact strength of the resin foam sheet of the composition containing the copolymer may be low and the buckling (compression) strength of the container made of the resin foam sheet may be low. On the other hand, if the content is larger than 90% by mass, the surface impact strength of the resin foam sheet of the composition containing the copolymer may also be low.

Preferably, the styrene-diene block copolymer for the component (B) has a melt flow rate ranging from 0.5 to 20 g/10 min (at 200° C. under 49N). This is because, if its melt flow rate is smaller than 0.5 g/10 min, the block copolymer (B) could not well disperse in the resin composition and therefore the surface impact strength of the resin foam sheet of the composition may be low; but if larger than 20 g/10 min, the reinforcing effect of the component (B) will be low and therefore the surface impact strength of the resin foam sheet of the composition may also be low.

The styrene-diene block copolymer for the component (B) may be prepared through known copolymerization of styrene with a diene. For example, it may be prepared through anionic polymerization of styrene with a diene such as butadiene or isoprene in the presence of a polymerization initiator. The polymerization initiator is preferably an alkyllithium such as n-butyl-lithium. Preferably, the solvent is cyclohexane.

The styrene-butadiene block copolymer and the styrene-isoprene block copolymer have unsaturated bonds in the polybutadiene or polyisoprene structure units therein. The unsaturated bonds may be saturated through hydrogenation to give styrene-diene block copolymer hydrogenates. The styrene-diene block copolymer hydrogenates may also be used for the component (B) in the resin composition of the invention. Preferably, the copolymer hydrogenate contains from 10 to 90% by mass of polystyrene structure units and has a melt flow rate ranging from 0.5 to 20 g/10 min.

In the aromatic vinyl polymer resin composition of the invention, the blend ratio of the aromatic vinyl polymer resin component (A) to the styrene-diene block copolymer component (B), (A)/(B) falls between 80/20 and 98/2 (% by mass). This is because, if the ratio of the styrene-diene block copolymer component (B) is larger than 20% by mass, the mechanical strength of the moldings of the resin composition, especially the buckling strength of containers thereof will be low; and if smaller than 2% by mass, the surface impact strength of the sheets of the resin composition will be low. More preferably, the blend ratio of the component (A) to the component (B), (A)/(B) ranges from 90/10 to 97/3 (% by mass).

The aromatic vinyl polymer resin composition of the invention is prepared by mixing the aromatic vinyl polymer resin (A) and the styrene-diene block copolymer (B) in the predetermined blend ratio followed by melt-kneading the resulting mixture. If desired, a plasticizer may be added to the resin composition to increase the flowability of the composition. For the plasticizer, preferred are liquid paraffin, and phthalates such as dibutyl phthalate and dioctyl phthalate. Preferably, the blend ratio of the plasticizer to the aromatic vinyl polymer resin composition falls between 0.1 and 1.0% by mass. If the ratio of the plasticizer is smaller than 0.1% by mass, the thermo-formability of the resin composition containing it may be poor; but if larger than 1.0% by mass, the mechanical strength of the products of the resin composition may be low. Also if desired, the aromatic vinyl polymer resin composition of the invention may further contain any ordinary lubricant, antistatic agent, antioxidant, thermal stabilizer, pigment, dye and UV absorbent. The quantity of the additives may be suitably determined.

The thus-obtained aromatic vinyl polymer resin composition may be melt-kneaded and extruded out through an ordinary extruder, and then pelletized for use in molding into resin foam sheets. Preferably, the pellets have a size ranging from 50 to 70 pellets/g in order that they can be stably molded through extrusion to give foamed moldings. Also preferably, the pellets are coated with an external lubricant such as ethylene bisstearamide to a degree of from 20 to 200 ppm or so, before foamed and molded through extrusion. The expansion ratio in foaming and molding the composition into resin foam sheets ranges from 3 to 12 times. If the expansion ratio is smaller than 3 times, the containers molded by thermoforming the resin foam sheet will be heavy and, in addition, their heat-insulating property may be low. On the other hand, if the expansion ratio is larger than 12 times, the mechanical strength of the containers will be low. In molding the resin composition into foam sheets, any ordinary foaming agent, for example, hydrocarbon gas such as propane, butane, pentane, or flon, carbon dioxide, nitrogen or water may be added thereto.

The thus-molded resin foam sheet may be thermoformed, for example, in a mode of vacuum forming or pressure forming into wrapping or packaging containers for edibles or sundries. The containers have a good appearance well balanced with the mechanical strength thereof, since the aromatic vinyl polymer resin composition for them comprises an aromatic vinyl polymer resin component having a specific molecular weight, a specific molecular weight distribution and a specific branch structure, and a specific elastomer component. Therefore, even when the resin composition is molded into such wrapping or packaging containers by foaming it to a high expansion ratio, the containers have good surface smoothness and glossiness and are easy to print on their surfaces.

EXAMPLES

The invention is described in more detail with reference to the following Examples and Comparative Examples, which, however, are not intended to restrict the scope of the invention.

Example 1

(1) Preparation of Aromatic Vinyl Polymer Resin:

A polyfunctional initiator, 2,2-bis(4,4-di-tert-butylperoxycyclohexyl)propane (Perkadox 12, made by Kayaku Akuzo Corporation) and a solvent, ethylbenzene were added to styrene to prepare a monomer solution. The amount of the initiator added was 350 ppm of styrene, in terms of the pure product of the compound; and that of the solvent was 8% by mass of styrene.

At a flow rate of 20 liters/hr, the monomer solution was continuously introduced into a polymerization unit of four reactors connected in series. Concretely, it was first led into a first, 20-liter complete-mixing type reactor kept at 112° C., and the resulting polymer was led into a second, 20-liter complete-mixing type reactor kept at 120° C., then into a third, 30-liter plug-flow reactor kept at 140° C., and finally into a fourth, 30-liter plug-flow reactor kept at 165° C. in that order. In the polymerization unit, the monomer was polymerized to a final conversion of 85%.

After thus polymerized, the reaction product was led into a vacuum devolatizing tank heated at 240 to 250° C., in which the volatile components such as the non-reacted monomer and the solvent were removed to obtain a polystyrene resin.

Analyzed according to the method described herein, the polystyrene resin obtained herein was found to have a linear weight-average molecular weight (MwL) of 300,000. The ratio of the weight-average molecular weight (MwL) to the number-average molecular weight (MnL) of the polystyrene resin, (MwL)/(MnL) was 2.8. The number of branches in one molecule of the polystyrene resin having an absolute molecular weight of 1,190,000 was 0.7, and the inertial radius $Rg_L$ of linear polystyrene corresponding to the resin was 54.6 nm. The melt flow rate of the polystyrene resin, measured according to JIS K-7210 at a temperature of 200° C. and under a load of 49 N, was 2.6/10 min.

(2) Production of Aromatic Vinyl Polymer Resin Composition:

97 parts by mass of the aromatic vinyl polymer resin, polystyrene resin obtained in the above (1) was mixed with 3 parts by mass of a styrene-diene block copolymer, concretely styrene-butadiene block copolymer having a configuration of polystyrene-polybutadiene-polystyrene and having a polystyrene content of 40% by mass (Tufprene 125, made by Asahi Kasei Corporation), and the resulting mixture was melt-kneaded and extruded through a double-screw melt extruder to give strands. After cooled, the strands were cut into pellets having a size of 60 pellets/g.

(3) Production and Evaluation of Resin Foam Sheet:

The resin pellets obtained in the above (2) were fed into an extrusion foam-molding machine with a foaming agent, carbon dioxide introduced thereinto, and molded into a resin foam sheet having a thickness of 1.5 mm. The expansion ratio of the sheet was 5 times.

The surface glossiness of the resin foam sheet was 30%, measured according to JIS K-7105. The surface impact strength of the sheet was 0.4 J, measured at 23° C. under a load of 19.6 N. The diameter of the impact point was 12.7 mm, the speed of the impactor was 0.85 m/sec, and the diameter of the hole of the sample stand was 50 mm.

(4) Fabrication of Food Trays:

Using a vacuum forming machine, the resin foam sheet obtained in the above (3) was molded into food trays having a width of 12 cm, a length of 20 cm and a depth of 2 cm.

The food tray was tested for buckling (compression) resistance by buckling up its lateral sides. Thus measured, the maximum stress of the tray indicates the buckling strength thereof. On the other hand, the resin foam sheet was molded into various trays that differ in the depth. Of those, the deep-drawn trays were checked whether their surface was broken or not. Based on the breaking tenacity of the deep-drawn trays, the thermo-formability of the resin foam sheet was evaluated according to the 3-rank criteria mentioned below.

A: Not broken.
B: Broken but a little.
C: Broken.

The results are given in Table 1 below.

Example 2

(1) Preparation of Aromatic Vinyl Polymer Resin:

An aromatic vinyl polymer resin was prepared in the same manner as in the step (1) in Example 1, for which, however, the temperature in the third reactor was 145° C. and the temperature in the fourth reactor was 162° C.

(2) Production of Aromatic Vinyl Polymer Resin Composition:

Using the aromatic vinyl polymer resin obtained in the above (1), a resin composition was produced in the same manner as in the step (2) in Example 1.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Example 3

(1) Preparation of Aromatic Vinyl Polymer Resin:

An aromatic vinyl polymer resin was prepared in the same manner as in the step (1) in Example 1 except for the following points: The polyfunctional initiator was divided into two portions, 300 ppm and 130 ppm, and the former was added to the monomer solution while the latter was led into the third reactor. The flow rate of the monomer solution led into the polymerization unit was 23 liters/hr. The temperature was 120° C. in the first reactor, 125° C. in the second reactor, 130° C. in the third reactor and 140° C. in the fourth reactor.

(2) Production of Aromatic Vinyl Polymer Resin Composition:

Using the aromatic vinyl polymer resin obtained in the above (1), a resin composition was produced in the same manner as in the step (2) in Example 1.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Example 4

(1) Preparation of Aromatic Vinyl Polymer Resin:

An aromatic vinyl polymer resin was prepared in the same manner as in the step (1) in Example 1 except for the following points: The polyfunctional initiator was divided into two portions, 180 ppm and 50 ppm, and the former was added to the monomer solution while the latter was led into the third reactor. The flow rate of the monomer solution led into the polymerization unit was 27 liters/hr. The temperature was 130° C. in the first reactor, 135° C. in the second reactor, 140° C. in the third reactor and 155° C. in the fourth reactor.

(2) Production of Aromatic Vinyl Polymer Resin Composition:

Using the aromatic vinyl polymer resin obtained in the above (1), a resin composition was produced in the same manner as in the step (2) in Example 1.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Example 5

(1) Preparation of Aromatic Vinyl Polymer Resin:

An aromatic vinyl polymer resin was prepared in the same manner as in the step (1) in Example 1.

(2) Production of Aromatic Vinyl Polymer Resin Composition:

An aromatic vinyl polymer resin composition was produced in the same manner as in the step (2) in Example 1, for which, however, 90 parts by mass of the polymer resin obtained in the above (1) was mixed with 10 parts by mass of the same styrene-butadiene block copolymer as in the step (2) in Example 1.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Example 6

(1) Preparation of Aromatic Vinyl Polymer Resin:

An aromatic vinyl polymer resin was prepared in the same manner as in the step (1) in Example 3.

(2) Production of Aromatic Vinyl Polymer Resin Composition:

An aromatic vinyl polymer resin composition was produced in the same manner as in the step (2) in Example 1, for which, however, 85 parts by mass of the polymer resin obtained in the above (1) was mixed with 15 parts by mass of the same styrene-butadiene block copolymer as in the step (2) in Example 1.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Example 7

(1) Preparation of Aromatic Vinyl Polymer Resin:

An aromatic vinyl polymer resin was prepared in the same manner as in the step (1) in Example 3.

(2) Production of Aromatic Vinyl Polymer Resin Composition:

An aromatic vinyl polymer resin composition was produced in the same manner as in the step (2) in Example 1, for which, however, 85 parts by mass of the polymer resin obtained in the above (1) was mixed with 15 parts by mass of a styrene-diene block copolymer hydrogenate, concretely styrene-butadiene block copolymer hydrogenate having a configuration of polystyrene-polybutadiene-polystyrene and having a polystyrene content of 40% by mass (Tuftec H1041, made by Asahi Kasei Corporation).

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Comparative Example 1

(1) Preparation of Aromatic Vinyl Polymer Resin:

An aromatic vinyl polymer resin was prepared in the same manner as in the step (1) in Example 1 except for the following points: The amount of the polyfunctional initiator added to the monomer solution was 150 ppm. The flow rate of the monomer solution led into the polymerization unit was 35 liters/hr. The temperature was 140° C. in the first reactor, 155° C. in the second reactor, 160° C. in the third reactor and 165° C. in the fourth reactor.

(2) Production of Aromatic Vinyl Polymer Resin Composition:

Using the aromatic vinyl polymer resin obtained in the above (1), a resin composition was produced in the same manner as in the step (2) in Example 1.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Comparative Example 2

(1) Preparation of Aromatic Vinyl Polymer Resin:

An aromatic vinyl polymer resin was prepared in the same manner as in the step (1) in Example 1 except for the following points: The polyfunctional initiator used is 1,1-di (tert-butylperoxy)-3,3,5-trimethylcyclohexane (Perhexa 3M, made by NOF Corporation), and its amount added to the monomer solution was 300 ppm of styrene, in terms of the pure product of the compound. The flow rate of the monomer solution led into the polymerization unit was 12 liters/hr. The temperature was 110° C. in the first reactor, 120° C. in the second reactor, 130° C. in the third reactor and 155° C. in the fourth reactor.

(2) Production of Aromatic Vinyl Polymer Resin Composition:

Using the aromatic vinyl polymer resin obtained in the above (1), a resin composition was produced in the same manner as in the step (2) in Example 1.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Comparative Example 3

(1) Preparation of Aromatic Vinyl Polymer Resin:

An aromatic vinyl polymer resin was prepared in the same manner as in the step (1) in Example 1, for which, however, the temperature was 100° C. in the first reactor, 120° C. in the second reactor, 122° C. in the third reactor and 180° C. in the fourth reactor.

(2) Production of Aromatic Vinyl Polymer Resin Composition:

Using the aromatic vinyl polymer resin obtained in the above (1), a resin composition was produced in the same manner as in the step (2) in Example 1.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Comparative Example 4

(1) Preparation of Aromatic Vinyl Polymer Resin:

An aromatic vinyl polymer resin was prepared in the same manner as in the step (1) in Example 1 except for the following points: The amount of the polyfunctional initiator added to the monomer solution was 400 ppm. The flow rate of the monomer solution led into the polymerization unit was 15 liters/hr. The temperature was 110° C. in the first reactor, 112° C. in the second reactor, 118° C. in the third reactor and 125° C. in the fourth reactor.

(2) Production of Aromatic Vinyl Polymer Resin Composition:

Using the aromatic vinyl polymer resin obtained in the above (1), a resin composition was produced in the same manner as in the step (2) in Example 1.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Comparative Example 5

(1) Preparation of Aromatic Vinyl Polymer Resin:

An aromatic vinyl polymer resin was prepared in the same manner as in the step (1) in Example 1.

(2) Production of Aromatic Vinyl Polymer Resin Composition:

Not mixed with a styrene-butadiene block copolymer, the aromatic vinyl polymer resin obtained in the above (1) was directly used in producing a resin foam sheet.

(3) Production and Evaluation of Resin Foam Sheet:

In the same manner as in the step (3) in Example 1, the aromatic vinyl polymer resin of the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Comparative Example 6

(1) Preparation of Aromatic Vinyl Polymer Resin:

An aromatic vinyl polymer resin was prepared in the same manner as in the step (1) in Example 1.

(2) Production of Aromatic Vinyl Polymer Resin Composition:

An aromatic vinyl polymer resin composition was produced in the same manner as in the step (2) in Example 1, for which, however, 75 parts by mass of the polymer resin obtained in the above (1) was mixed with 25 parts by mass of the same styrene-butadiene block copolymer as in the step (2) in Example 1.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

Comparative Example 7

(1) Preparation of Aromatic Vinyl Polymer Resin:

An aromatic vinyl polymer resin was prepared in the same manner as in the step (1) in Example 1.

(2) Production of Aromatic Vinyl Polymer Resin Composition:

An aromatic vinyl polymer resin composition was produced in the same manner as in the step (2) in Example 1, for which, however, 75 parts by mass of the polymer resin obtained in the above (1) was mixed with 25 parts by mass of the same styrene-butadiene block copolymer hydrogenate as in the step (2) in Example 7.

(3) Production and Evaluation of Resin Foam Sheet:

In the same manner as in the step (3) in Example 1, the aromatic vinyl polymer resin composition obtained in the above (2) was molded into a resin foam sheet and the sheet was evaluated.

(4) Fabrication and Evaluation of Food Trays:

In the same manner as in the step (4) in Example 1, the resin foam sheet obtained in the above (3) was molded into food trays and the food trays were evaluated.

The results are given in Table 1.

TABLE 1

| | Component [A] | | | | Component [B] | Sheet[*1] | | Tray | |
|---|---|---|---|---|---|---|---|---|---|
| Example (Comparative Example) | MwL (× $10^4$) | MwL/MnL | number of branches | melt flow rate | blend ratio (wt. pts.) | glossiness (%) | surface impact strength (J) | thermo-formability | buckling strength (kPa) |
| 1 | 30.0 | 2.8 | 0.7 | 2.6 | 3.0 | 30 | 0.4 | A | 50 |
| 2 | 31.0 | 3.0 | 0.4 | 2.4 | 3.0 | 32 | 0.5 | A | 60 |
| 3 | 33.0 | 2.3 | 0.7 | 1.6 | 3.0 | 25 | 0.4 | A | 50 |
| 4 | 27.0 | 2.3 | 0.4 | 3.5 | 3.0 | 33 | 0.4 | A | 50 |
| 5 | 30.0 | 2.8 | 0.7 | 2.6 | 10.0 | 31 | 0.7 | A | 40 |
| 6 | 33.0 | 2.3 | 0.7 | 1.6 | 15.0 | 26 | 1.3 | A | 40 |
| 7 | 33.0 | 2.3 | 0.7 | 1.6 | 15.0 | 27 | 1.2 | A | 40 |

TABLE 1-continued

| | Component [A] | | | | Component [B] | Sheet(*1) | | Tray | |
|---|---|---|---|---|---|---|---|---|---|
| Example (Comparative Example) | MwL (× 10⁴) | MwL/MnL | number of branches | melt flow rate | blend ratio (wt. pts.) | glossiness (%) | surface impact strength (J) | thermo-formability | buckling strength (kPa) |
| (1) | 18.0 | 2.2 | 0.3 | 10.0 | 3.0 | 35 | 0.2 | A | 20 |
| (2) | 31.0 | 2.2 | 0.0 | 1.7 | 3.0 | 22 | 0.2 | C | 20 |
| (3) | 28.0 | 3.7 | 0.4 | 4.5 | 3.0 | 26 | 0.2 | A | 30 |
| (4) | 41.0 | 2.5 | 0.8 | 1.2 | 3.0 | 18 | 0.6 | B | 30 |
| (5) | 30.0 | 2.8 | 0.7 | 2.6 | — | 30 | 0.1 | A | 40 |
| (6) | 30.0 | 2.8 | 0.7 | 2.6 | 25.0 | 32 | 2.0 | A | 30 |
| (7) | 30.0 | 2.8 | 0.7 | 2.6 | 25.0 | 31 | 1.9 | A | 30 |

(*1)thickness 1.5 mm, expansion ratio 5.0.

As described in detail hereinabove with reference to its preferred embodiments, the present invention provides an aromatic vinyl polymer resin composition suitable to molding into resin foam sheets having a good appearance including surface smoothness and glossiness well balanced with the mechanical strength thereof even when the expansion ratio in molding it is increased, and provides resin foam sheets and containers of the composition.

What is claimed is:

1. An aromatic vinyl polymer resin composition comprising (A) from 97 to 98% by mass of an aromatic vinyl polymer resin having (1) a weight-average molecular weight (MwL) measured through GPC of from 200,000 to 400,000, (2) a ratio of weight-average molecular weight (MwL) to number-average molecular weight (MnL), (MwL)/(MnL) ranging from 2.2 to 3.6, (3) a number of branches of from 0.1 to 1.0 in one molecule having an absolute molecular weight of 1,190,000 measured through GPC-MALLS, and (4) a melt flow rate of from 1.5 to 3.5 g/10 min, and (B) from 2 to 3% by mass of a styrene-diene block copolymer or its hydrogenate.

2. The aromatic vinyl polymer resin composition as claimed in claim 1, wherein the aromatic vinyl polymer resin (A) is a polystyrene resin.

3. The aromatic vinyl polymer resin composition as claimed in claim 1 or 2, wherein the styrene-diene block copolymer or its hydrogenate (B) is a styrene-butadiene block copolymer or styrene-isoprene block copolymer or a hydrogenate thereof that contains polystyrene block structure units to an extent of from 10 to 90% by mass thereof.

4. The aromatic vinyl polymer resin composition of claim 1, wherein said weight-average molecular weight is from 250,000 to 350,000.

5. The aromatic vinyl polymer resin composition of claim 1, wherein said ratio of weight-average molecular weight (MwL) to number-average molecular weight (MnL), (MwL)/(MnL) ranging from 2.5 to 3.0.

6. The aromatic vinyl polymer resin composition of claim 1, wherein said number of branches of from 0.2 to 0.8 in one molecule having an absolute molecular weight of 1,190,000 measured through GPC-MALLS.

7. The aromatic vinyl polymer resin composition of claim 1, wherein said melt flow rate of from 2.0 to 3.0 g/10 mm.

8. The aromatic vinyl polymer resin composition of claim 1, wherein monomers which comprise said aromatic vinyl polymer resin are at least one monomer selected from the group consisting of styrene, a-substituted alkyl styrene, nucleus-substituted alkylstyrene and nucleus-substituted halogenostyrene.

9. The aromatic vinyl polymer resin composition of claim 1, wherein said aromatic vinyl polymer resin is further comprised of at least one monomer selected from the group consisting of acrylonitrile, acrylic acid, methacrylic acid, maleic acid, fumaric acid, maleic anhydride, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl metacrylate, maleimide and nucleus-substituted phenylmaleimides.

10. The aromatic vinyl polymer resin composition of claim 1, wherein said styrene-diene block copolymer has a melt flow rate ranging from 0.5 to 20 g/10 mm.

* * * * *